(12) United States Patent
Tokura et al.

(10) Patent No.: US 6,754,574 B2
(45) Date of Patent: Jun. 22, 2004

(54) CONTROLLER FOR AUTOMATIC TRANSMISSION

(75) Inventors: Takaaki Tokura, Toyota (JP); Katsumi Kono, Toyota (JP); Norimi Asahara, Nishikamo-gun (JP); Ryoichi Hibino, Nagoya (JP); Hiroyuki Nishizawa, Tajimi (JP); Masataka Osawa, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/347,765

(22) Filed: Jan. 22, 2003

(65) Prior Publication Data

US 2003/0163235 A1 Aug. 28, 2003

(30) Foreign Application Priority Data

Jan. 24, 2002 (JP) ....................................... 2002-015858
Mar. 4, 2002 (JP) ....................................... 2002-057824

(51) Int. Cl.[7] ............................................. F16H 61/08
(52) U.S. Cl. ............................. 701/67; 701/51; 701/84; 180/176; 477/335
(58) Field of Search .............................. 701/51, 55, 61, 701/64, 67, 84, 58; 180/179, 176; 477/335, 143, 906

(56) References Cited

U.S. PATENT DOCUMENTS 4,905,786 A * 3/1990 Miyake et al. .............. 180/179
5,505,100 A * 4/1996 Mitchell et al. .............. 74/335
6,334,833 B1 * 1/2002 Ochi et al. .................. 477/143

FOREIGN PATENT DOCUMENTS

| JP | A 7-305763 | 11/1995 |
| JP | A 9-249051 | 9/1997 |
| JP | A 2000-97324 | 4/2000 |
| JP | A 2000-97325 | 4/2000 |
| JP | A 2000-170890 | 6/2000 |

* cited by examiner

Primary Examiner—Thomas G. Black
Assistant Examiner—Arthur D. Donnelly
(74) Attorney, Agent, or Firm—Oliff & Berridge, PLC

(57) ABSTRACT

When changing gear, engagement side clutch coupling force of an automatic transmission (32) is controlled in response to an engagement side clutch coupling force control amount set in advance in an engagement side clutch coupling force control amount storage section (36). A disengagement side clutch coupling force control amount calculating block (40) has a physical model of the automatic transmission (32) internally. This disengagement side clutch coupling force control amount calculating block (40) then calculates disengagement side clutch coupling force control amount from a transmission input torque estimation value estimated by a transmission input torque estimation block (34), a running resistance estimation value from a running resistance estimation block (38) and engagement side clutch coupling force control amount using the physical model, and controls the automatic transmission (32) using the calculated disengagement side clutch coupling force control amount. Since disengagement side clutch coupling force control amount is calculated using a physical model, it is easy to adjust the disengagement side clutch coupling amount. It is also suitable to control engine torque at the time of gear shift, and this engine torque can also be determined using a physical equation.

14 Claims, 14 Drawing Sheets

|      | C1 | C2 | C3 | B1 | B2 | B3 | F1 | F2 |
|------|----|----|----|----|----|----|----|----|
| Rev  | ×  | ×  | ○  | ×  | ×  | ○  | ×  | ×  |
| D1st | ○  | ×  | ×  | ×  | ×  | ×  | ×  | ○  |
| D2nd | ○  | ×  | ×  | ×  | ○  | ×  | ○  | ×  |
| D3rd | ○  | ○  | ×  | ×  | ○  | ×  | ×  | ×  |
| D4th | ×  | ○  | ×  | ○  | ○  | ×  | ×  | ×  |
| S1st | ○  | ×  | ×  | ×  | ×  | ×  | ×  | ○  |
| S2nd | ○  | ×  | ×  | ○  | ○  | ×  | (○)| ×  |
| L1st | ○  | ×  | ×  | ×  | ×  | ○  | ×  | (○)|

Fig. 8

CONTROLLER FOR AUTOMATIC TRANSMISSION

FIELD OF THE INVENTION

The present invention relates to a controller for an automatic transmission used in an automobile or the like.

BACKGROUND OF THE INVENTION

Automatic transmissions have been widely used as transmissions for automobiles etc. With a conventional automatic transmission, taking a drive shaft of a driving motor, such as an engine, as input, a turbine of an input shaft of a torque converter is caused to rotate, and the input is converted at a specified gear ratio by a planetary gear connected to the input shaft and conveyed to an output shaft. A plurality of frictional engagement devices for clutches or brakes are provided between the input shaft and the output shaft in order to regulate movement of this planetary gear, and gear ratio is switched depending on which of these frictional engagement devices are engaged. Normally, frictional engagement devices that are caused to engage are switched according to input shaft rotation speed and throttle opening amount to switch gear ratios.

As a general rule, a gear shift controller for an automatic transmission sequentially progresses through gear shift start time control, torque phase control, inertia phase control, and gear shift completion time control. Here, the torque phase is a zone where engagement side clutches are engaged and respective conveyed torque is being converted while disengaging disengagement side clutches, and the inertia phase is a zone where input shaft rotation speed is drawn towards a rotation speed determined by output shaft rotation speed and target gear ratio.

In the torque phase, if engagement side clutch engagement is slow compared to the timing of disengaging the disengagement side clutch, at the time of disengaging the disengagement side clutch, torque conveyed to the engagement side clutch is sufficiently small compared to input torque for turbine speed to suddenly increase. On the other hand, the engagement side clutch engagement timing is early, conveyed torque through the engagement side clutch at the time of disengaging the disengagement side clutch becomes large and turbine speed drops rapidly.

In the inertia phase, regulation of the input shaft rotation speed is carried out by causing frictional engagement devices to engage, but at this time if the frictional engagement devices are suddenly engaged, output torque changes suddenly generating gear shift shock. Also, since the time required to change gear is prolonged if the frictional engagement devices are engaged slowly, this is undesirable from the driver's point of view and also lowers the durability of the frictional engagement devices.

SUMMARY OF THE INVENTION

An advantage of the present invention is that it provides an automatic transmission controller that can appropriately perform an appropriate gear shift operation.

With the present invention, in the torque phase engagement side clutch coupling force is set by a setting device. A coupling force controller then determines disengagement side clutch coupling force control amount according to the engagement side clutch control state using a physical model of the automatic transmission.

It is therefore possible to carry out adjustment of coupling force for the engagement side clutches and the disengagement side clutches by changing engagement side clutch coupling force setting without changing both the engagement side clutch coupling force and the disengagement side clutch coupling force by trial and error. Also, in the physical model, timing adjustments can be carried out easily by adjusting a specified offset.

In the inertia phase it is appropriate to perform engine torque control. At this time, it is preferable to compute a drive torque target value using a physical equation that uses an inertia phase time target value and a conveyed torque estimation means estimation value. In this way it becomes necessary to use a control map in order to obtain a drive torque command value, and it is possible to omit a task of experimentally ascertaining a suitable value for the drive torque command value. Accordingly, it is possible to significantly reduce control map creation time while at the same time reconcile the mutual incompatibility between gear shift shock and gear shift time in the inertia phase.

BRIEF DESCRIPTION OF THE DRAWINGS

FIG. 8 is a drawing for describing gear stages achieved by combining operating of frictional engagement devices in the automatic transmission of the embodiments.

DETAILED DESCRIPTION OF THE INVENTION

Embodiments of the present invention will be described in the following based on the drawings.

First of all, a simple description will be given for an automatic transmission using clutch to clutch control of this embodiment. With this automatic transmission, while output of a gear stage conveying drive power (disengagement side) is being disengaged, output of a gear stage conveying drive power from this gear stage (engagement side) to carry out switching of gear stages.

Figure 1:
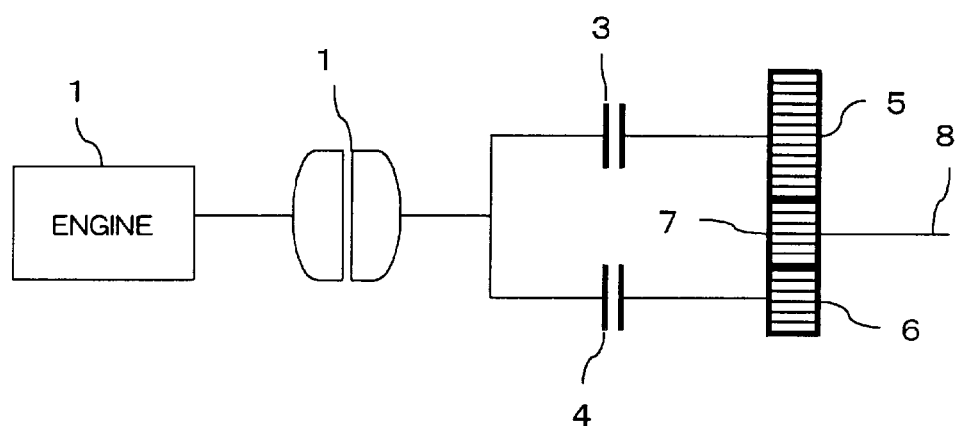
FIG. 1 is a drawing showing the structure of an automatic transmission.

Specifically, as shown in FIG. 1, output of the engine 1 is transmitted to the clutches 3 and 4 via the torque converter 2. With this example, the clutch 3 is a clutch for fourth gear while the clutch 4 is a clutch for third gear. A fourth gear 5 is connected to an output side of the clutch 3 and a third gear 6 is connected to the output side of the clutch 4. The fourth gear 5 and third gear 6 are engaged with an output gear 7 and a drive shaft 8 is connected to this output gear 7.

For example, shifting of gears from third gear to fourth gear is carried out by disengaging the clutch 4 from a coupled state and engaging the clutch 3 from a disengaged state.

Figure 2:
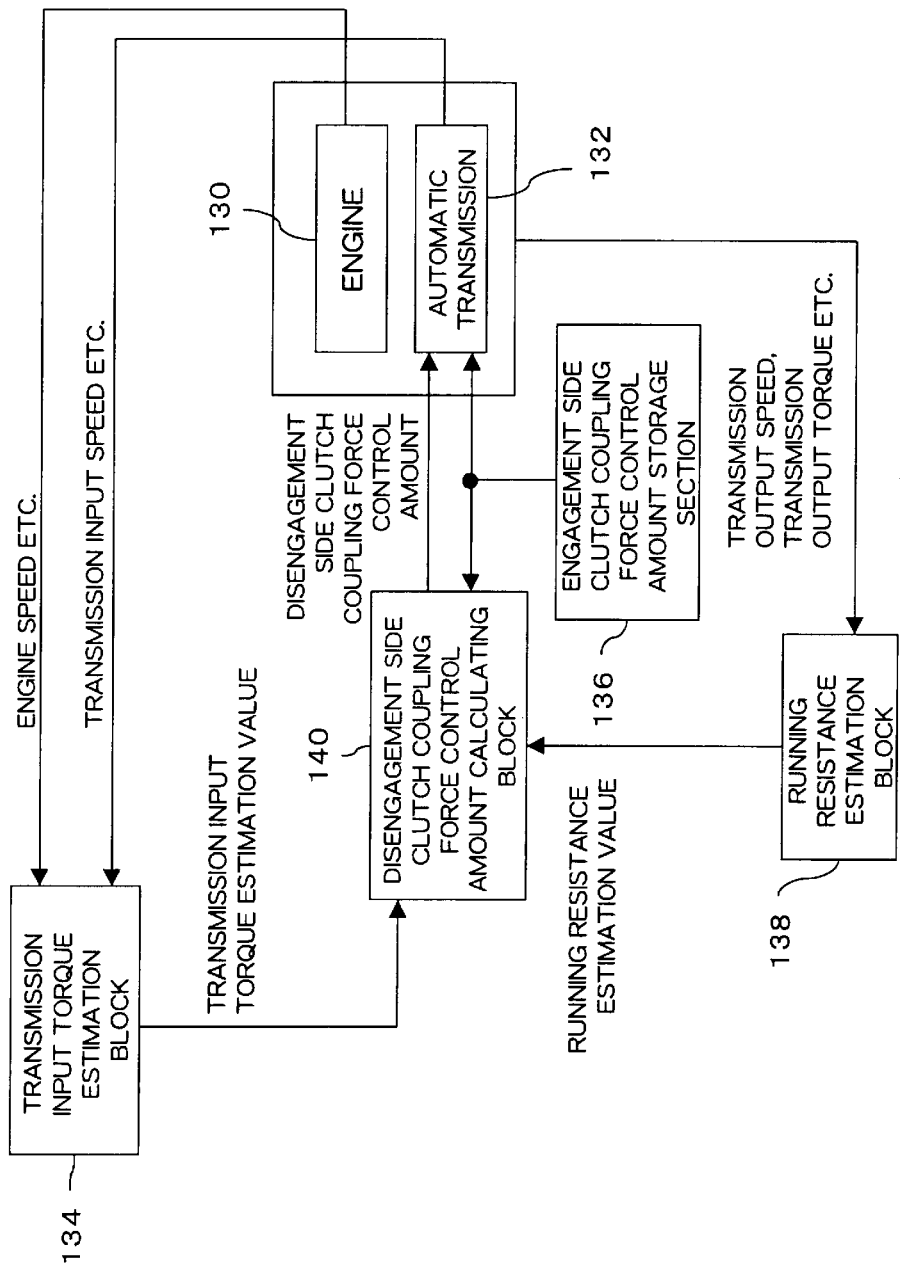
FIG. 2 is a drawing showing the structure of an automatic transmission control system relating to an embodiment.

FIG. 2 is a block diagram showing the overall structure of a system including an automatic transmission controller of the embodiment.

An output shaft of an engine 130 is connected to an automatic transmission 132, and an output shaft of this automatic transmission 132 is transmitted to the vehicle wheels via a differential gear etc.

Signals representing output conditions of the engine 130, such as engine rotation speed etc., are supplied to a transmission input torque estimation block 134. Signals representing transmission conditions in the automatic transmission 132, such as transmission input rotation speed etc., are also supplied to the transmission input torque estimation block 134. As shown in FIG. 1, a torque converter is arranged between the engine output shaft and the clutches. Rotation speed of the transmission input shaft is the rotation speed of the torque converter output shaft, and rotation speed of the torque converter input shaft is the rotation speed of the engine. A transmission input torque (torque converter output torque) estimation value is computed by the transmission input torque estimation block 134 based on these input signals.

Specifically, torque ratio between input and output of the torque converter and torque converter capacity are determined by a ratio of input rotation speed to output rotation speed. Torque converter characteristics are determined according to the input signals described above. In this torque converter characteristic, a value that is the engine rotation speed squared is calculated as torque converter output torque. However, this does not consider dynamic characteristics and it is preferable to calculate transmission input torque also taking dynamic characteristics into consideration.

An engagement side clutch coupling force control amount memory section 136 is also connected to the automatic transmission 132, from which an engagement side clutch coupling force control amount is directly provided. This engagement side clutch coupling force control amount has a predetermined characteristic, has a pattern causing gradual increase in hydraulic pressure to the engagement side clutch when there is a gear shift command, and can be set arbitrarily.

Signals representing transmission states of the automatic transmission 132, such as transmission output speed and transmission output torque, are supplied to a running resistance estimation block 138. This running resistance estimation block 138 calculates running resistance when actually running from transmission output speed and transmission output torque. Running resistance previously obtained from mechanical friction of the torque transmission system and air resistance depending on the vehicle speed, etc., is also considered.

A transmission input torque estimation value from the transmission input torque estimation block 134 is supplied to a disengagement side clutch coupling force control amount calculating block 140. A running resistance estimation value from the running resistance estimation block 138 and an engagement side clutch coupling force control amount from the engagement side clutch coupling force control amount memory section 136 are also supplied to the disengagement side clutch coupling force control amount calculating block 140. The disengagement side clutch coupling force control amount calculating block 140 then generates an appropriate disengagement side clutch coupling force control amount based on the supplied estimation value etc. In particular, the disengagement side clutch coupling force control amount calculating block 140 has a physical model for the transmission section comprising clutches and gears of the automatic transmission 132. Supplied running resistance and input shaft torque and engagement side clutch coupling force control amount are input to this physical model, an appropriate disengagement side clutch coupling force control amount is calculated and this is supplied to the automatic transmission 132.

Accordingly, disengagement side clutch coupling force is controlled in the automatic transmission 132 based on the supplied disengagement side clutch coupling force control amount. With this embodiment, with respect to engagement side clutch coupling force control amount, a predetermined pattern is stored and engagement side clutch coupling force is determined based on this stored pattern. The disengagement side clutch coupling force control amount calculating block 140 has a predetermined physical model, and optimum disengagement side clutch coupling force is determined by inputting supplied running resistance, input shaft torque and engagement side clutch coupling force control amount to the physical model. Therefore, differing from feedback control from actual torque transmission conditions, it is possible to determine disengagement side clutch coupling force rapidly and it is possible to carry out appropriate disengagement side clutch coupling force control. In particular, with this embodiment it is possible to complete tuning simply by determining engagement side clutch coupling force control amount stored in the engagement side clutch coupling force control amount memory section 136.

Here, the physical model of the disengagement side clutch coupling force control amount calculating block 140 obtains appropriate disengagement side clutch coupling force control amount by experimentation or the like according to running resistance, input shaft torque and engagement side clutch coupling force control amount and can be stored as a map. It is also possible to use equations of motion of the torque transmission system or the like.

Figure 3:
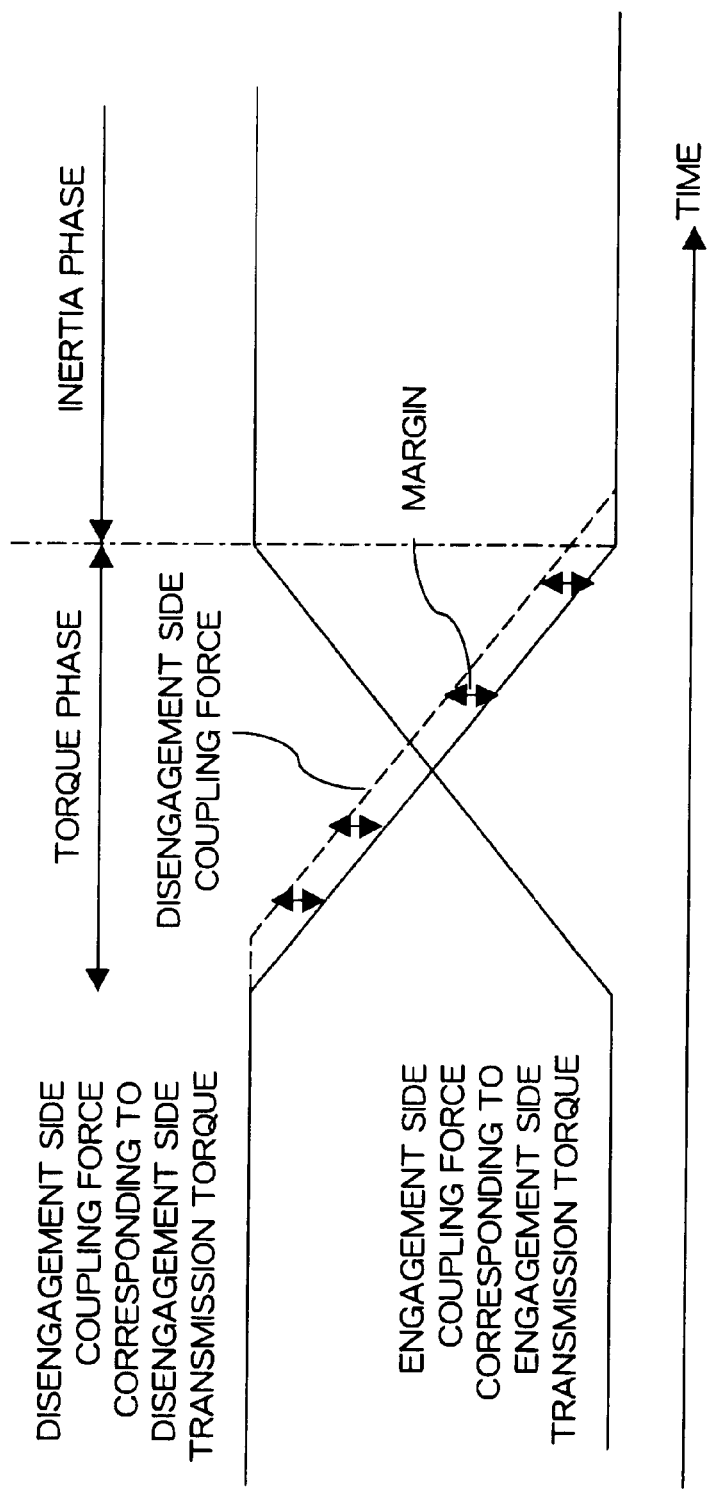
FIG. 3 is a drawing showing coupling force control states for an engagement side clutch and a disengagement side clutch.

FIG. 3 shows fundamental characteristics for transmission torque of the engagement side clutch and the disengagement side clutch at the time of changing gear. In the drawing, as shown by the solid lines, control is preferably carried out so that when the engagement side clutch transmission torque becomes the same as the transmission torque before gear shift (variation in gear ratio is ignored), disengagement side clutch transmission torque becomes 0 and the inertia phase is entered.

After rotational variation of the input shaft rotation has been generated is called the inertia phase, and before that is called the torque phase. Coupling force of the engagement side clutch and the disengagement side clutch is preferably made to correspond to this transmission torque. However, transmission torque of the disengagement side clutch basically matches torque that results from subtracting the engagement side clutch transmission force from input torque. The disengagement side clutch coupling force is preferably set to a little larger value allowing for a small margin of error rather than corresponding to disengagement side clutch transmission torque, as shown by the dotted line in the drawing.

The control shown in FIG. 3 represents ideal conditions, and the physical model of this embodiment takes into consideration various requirements with a feature being that disengagement side clutch coupling force is controlled to achieve this ideal state.

Figure 4:
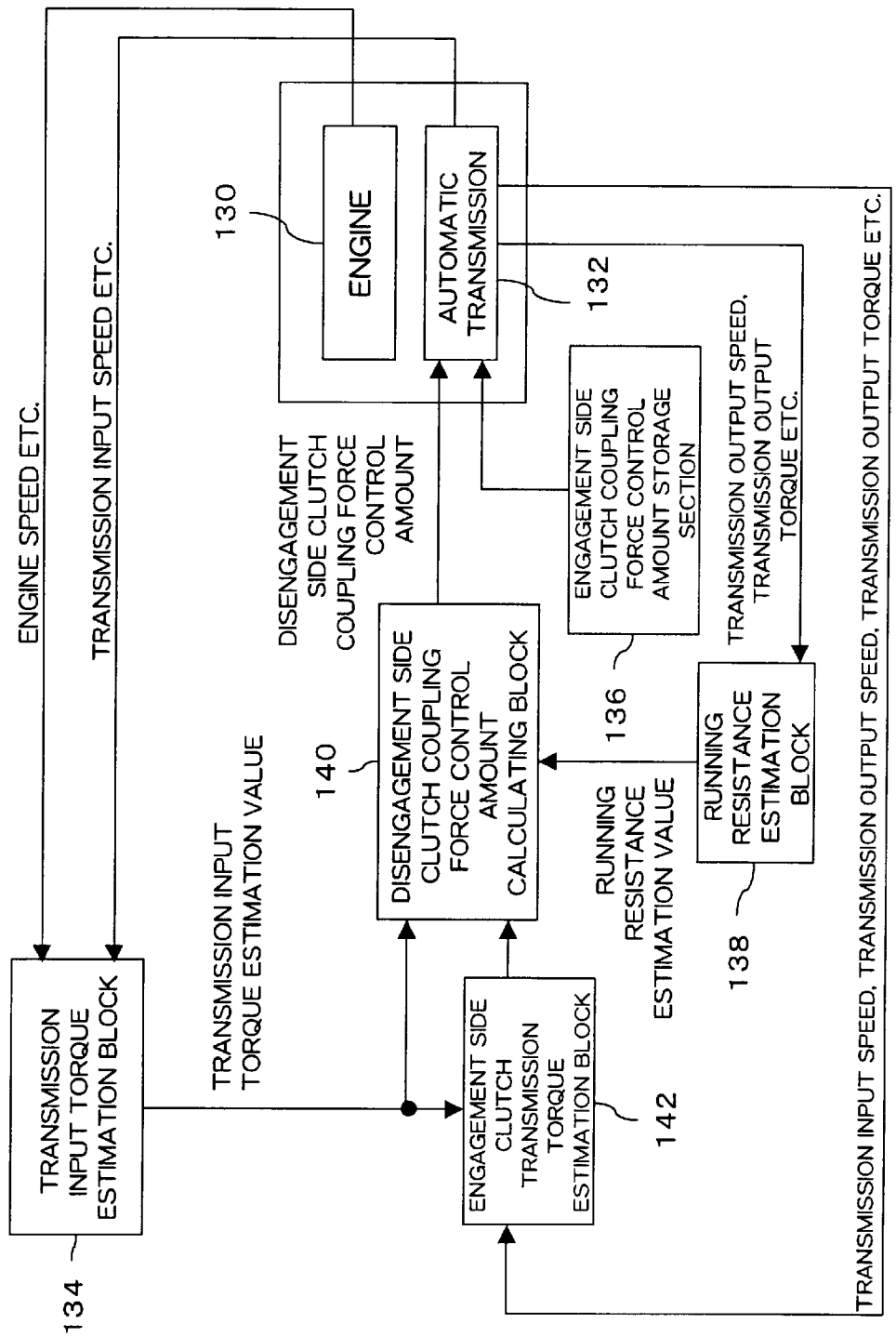
FIG. 4 is a drawing showing the structure of an automatic transmission control system relating to another embodiment.

FIG. 4 is another embodiment having an engagement side clutch transmission torque estimation block 142, and instead of supplying an engagement side coupling force control amount from the engagement side clutch coupling force control amount memory section 136 to the disengagement side clutch coupling force control amount calculating block 140, an engagement side clutch transmission torque estimation value from the engagement side clutch transmission torque estimation block 142 is supplied to the disengagement side clutch coupling force control amount calculating block 140. Optimum disengagement side clutch coupling force is determined by this disengagement side clutch coupling force control amount calculating block 140 by applying supplied running resistance, input shaft torque and engagement side clutch transmission torque estimation value to the physical model.

In particular, with this embodiment, since engagement side clutch transmission torque is estimated from the state of the automatic transmission 132, calculation of disengagement side clutch coupling force control amount can be carried out based on a more precise state of the engagement side clutch using the physical model.

Engagement side clutch coupling force control amount is also supplied to the disengagement side clutch coupling force control amount calculating block 140, and it is also suitable to recognize the state of the engagement side clutch from both that and an engagement side clutch transmission torque estimation value from the engagement side clutch transmission torque estimation block 142.

Figure 5:
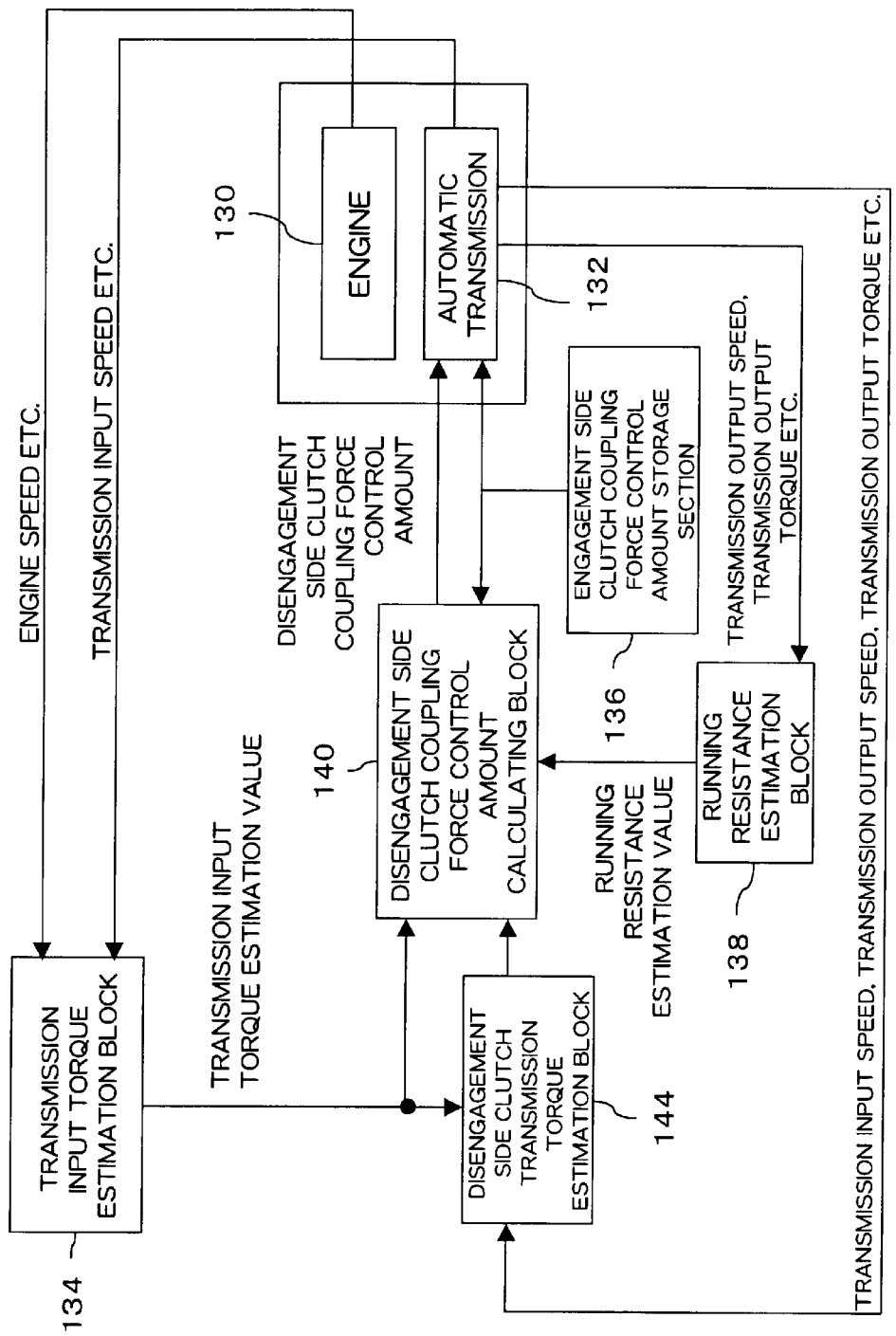
FIG. 5 is a drawing showing the structure of an automatic transmission control system relating to yet another embodiment.

FIG. 5 shows yet another embodiment, having a disengagement side clutch transmission torque estimation block 144, with a disengagement side clutch transmission torque estimation value being supplied from this disengagement side clutch transmission torque estimation block 144 to the disengagement side clutch coupling force control amount calculating block 140. Optimum disengagement side clutch coupling force is determined by this disengagement side clutch coupling force control amount calculating block 140, by applying supplied running resistance, input shaft torque and estimation values for the engagement side clutch transmission torque and disengagement side clutch transmission torque to the physical model.

In particular, with this embodiment a disengagement side clutch coupling force estimation value is supplied to the disengagement side clutch coupling force control amount calculating block 140. It is therefore possible to carry out feedback control of the disengagement side clutch coupling force.

Figure 6:
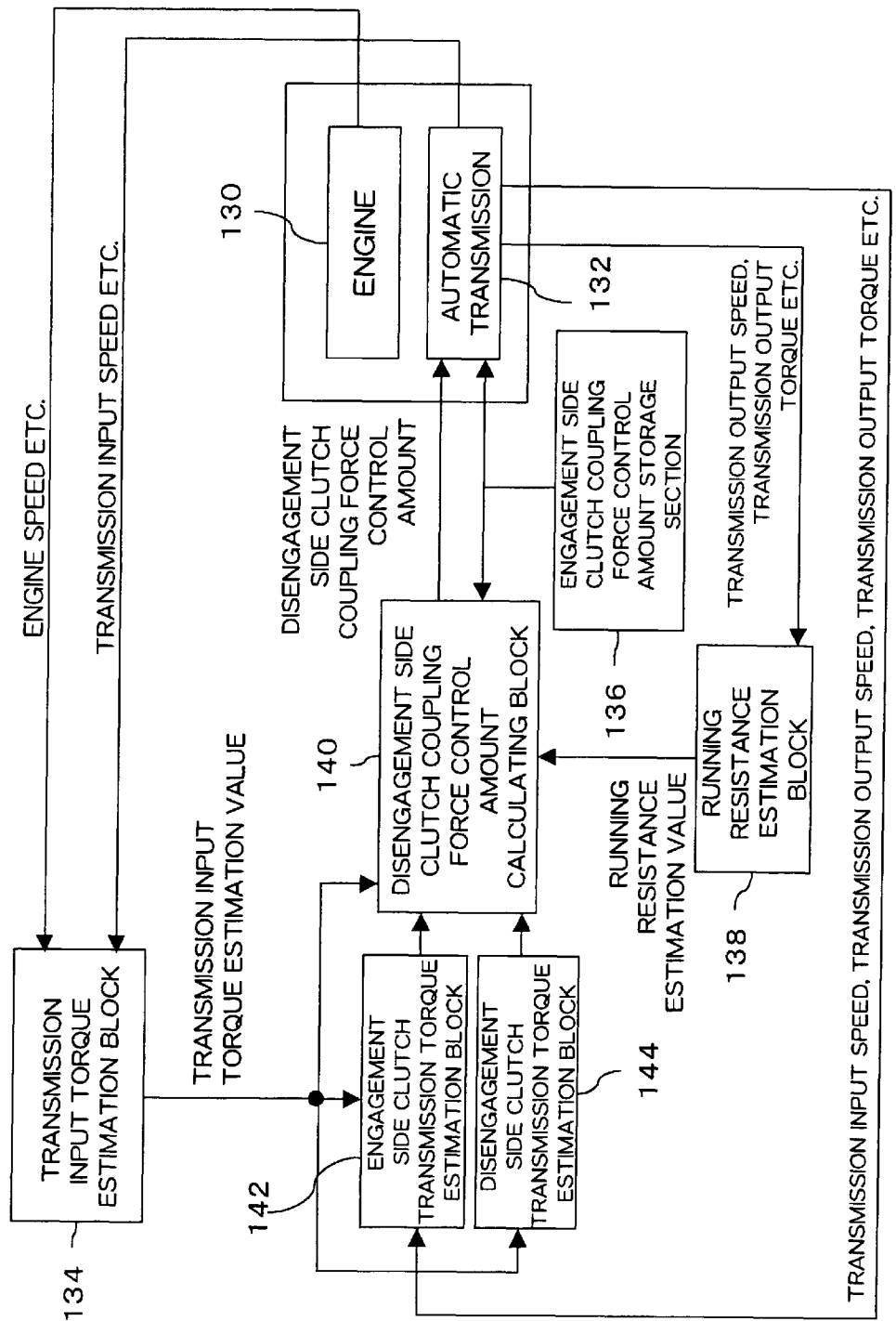
FIG. 6 is a drawing showing the structure of an automatic transmission control system relating to still another embodiment.

FIG. 6 shows a still further embodiment, having an engagement side clutch transmission torque estimation block 142 and a disengagement side clutch transmission torque estimation block 144. This makes it possible to estimate transmission torque for the engagement side clutch and the disengagement side clutch taking into consideration operation of the automatic transmission 132 and to determine disengagement side clutch coupling force control amount based on these estimation values. Engagement side clutch coupling force control amount is preferably supplied to the disengagement side clutch coupling force control amount calculating block 140.

As described above, according to this embodiment a control pattern for engagement side clutch coupling force is stored in advance in the engagement side clutch coupling force control amount memory section 136 and engagement side clutch coupling force is controlled based on this pattern. The disengagement side clutch coupling force control amount calculating block 140 has a physical model of the automatic transmission 132 and using this physical model it is possible to determine disengagement side clutch coupling force control amount according to the control state of the engagement side clutch. As a result, it is possible to carry out adjustment of the engagement side clutch and disengagement side clutch coupling forces by changing the engagement side clutch coupling force control pattern, without the need to change both the engagement side clutch coupling force and the disengagement side clutch coupling force by trial and error. It is also possible to easily perform timing adjustment by adjusting a specified offset in the physical model.

In this way, with the present invention engagement side clutch coupling force is set by setting means. The setting means then determines disengagement side clutch coupling force control amount according to the control state of the engagement side clutch using a physical model of the automatic transmission. As a result, it is possible to carry out adjustment of engagement side clutch and disengagement side clutch coupling forces by changing the engagement side clutch coupling force setting, without the need to change both the engagement side clutch coupling force and the disengagement side clutch coupling force by trial and error. It is also possible to easily perform timing adjustment by adjusting a specified offset in the physical model.

Also, by estimating engagement side transmission torque, the previously set engagement side clutch coupling force is made more precise and it is possible to determined disengagement side clutch coupling force.

It is also possible to control disengagement side clutch coupling force with higher precision by estimating disengagement side clutch transmission torque.

It is possible to control disengagement side clutch coupling force with even higher precision by estimating both engagement side (clutch) transmission torque and disengagement side clutch transmission torque.

Figure 7:
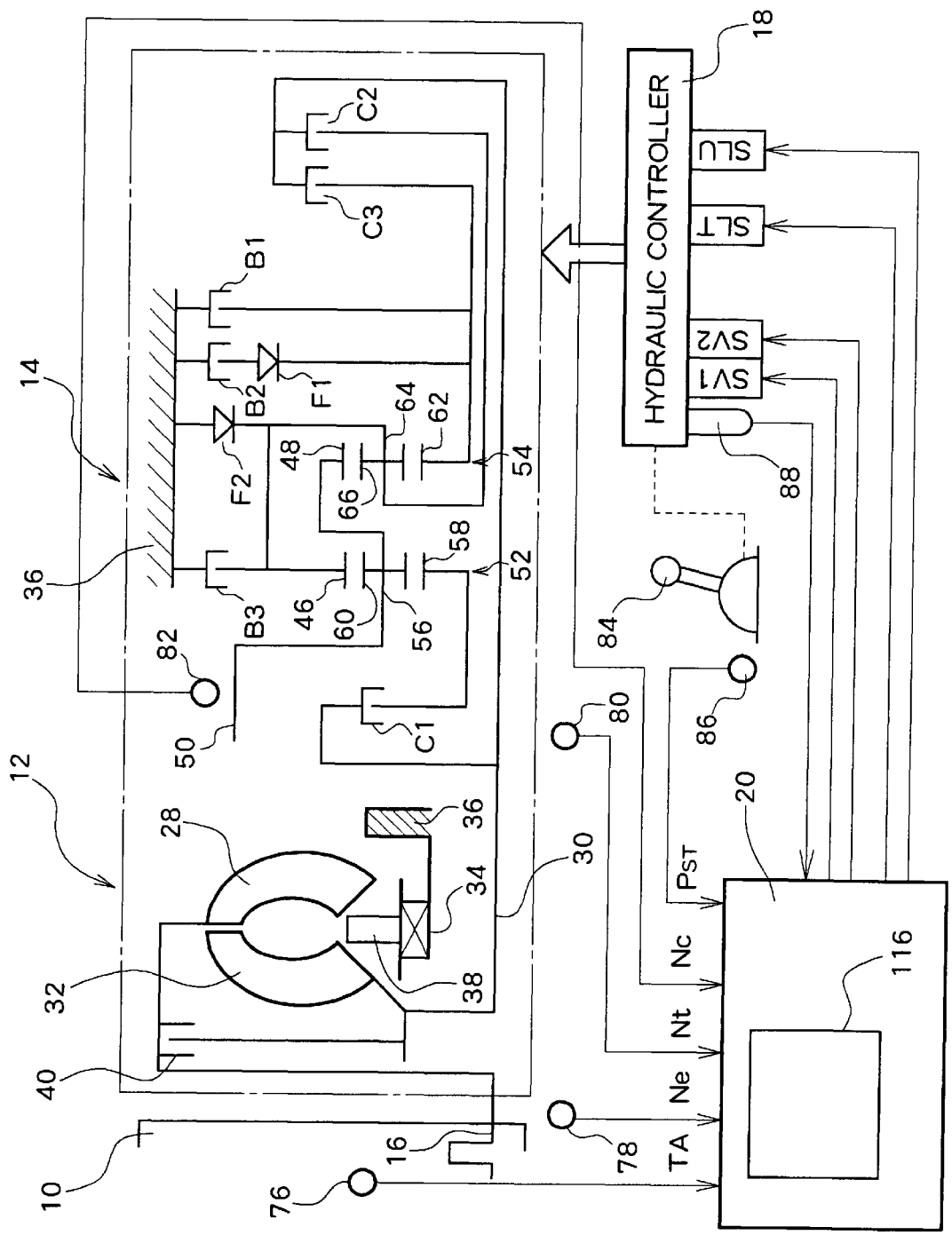
FIG. 7 is a drawing showing the structure of vehicle power transmission including an automatic transmission controller of an embodiment.

FIG. 7 is a drawing showing the structure of vehicle power transmission including an automatic transmission controller of another embodiment for carrying out engine toque control simultaneously in the inertia phase.

There are provided a torque converter 12 connected to an output shaft 16 of an engine 10, being a drive source, an automatic transmission 14, a hydraulic controller 18 for controlling gear stages of the transmission 14 and an electronic controller 20 for controlling hydraulic pressure of the controller 18. Drive torque output from the engine 10 is transmitted to drive wheels (not shown), via the torque converter 12, the automatic transmission 14 and a differential gear unit, (not shown).

The torque converter 12 comprises a pump vane-wheel 28 connected to the output shaft 16 of the engine 10, a turbine vane-wheel 32 connected to an input shaft 30 of the automatic transmission 14 and being supplied with drive torque from the pump vane-wheel 28 via a fluid, a fixed vane-wheel 38 fixed to a position fixing housing 36 via a one-way clutch 34, and a lock-up clutch 40 for connecting the pump vane-wheel 28 and the turbine vane-wheel 32 via a damper, (not shown).

The automatic transmission 14 is a multi-stage clutch for implementing four forward gears and a single reverse gear, and comprises an input shaft 30, a first planetary gear 52, a second planetary gear 54, and an output shaft 50 for transmitting drive torques to a differential gear unit, not shown. The first planetary gear 52 is made up of a sun gear 58, a planetary gear 60 attached to a carrier 56, and a ring gear 46. The second planetary gear 54 is made up of a sun gear 62, a planetary gear 66 attached to a carrier 64, and a ring gear 48.

The ring gear 46 and the carrier 64 are connected, the carrier 56 and the ring gear 48 are connected, and the carrier 56 is also connected to the output shaft 50. The input shaft 30 and the sun gear 58 are capable of being connected by a clutch C1, the input shaft 30 and the sun gear 58 are capable of being connected by a clutch C2, and the input shaft 30 and the sun gear 62 are capable of being connected by a clutch C3. The sun gear 62 is capable of being fixed to the housing 36 by a brake B1, and is also capable of being fixed to the housing 36 by a one-way clutch F1 and a brake B2. The ring gear 46 and the carrier 64 are capable of being fixed to the housing 36 by a brake B3, and are also capable of being fixed to the housing 36 for rotation in only one direction by the on-way clutch F2.

Engagement/disengagement states of the clutches C1, C2 and C3 and brakes B1, B2 and B3, which are frictional engagement devices, are respectively controlled by the hydraulic controller 18. Engagement/disengagement states of the one-way clutches F1 and F2, which are frictional engagement devices, are then regulated according to rotation direction. In this way, the four forward gears and the single reverse gear having differing gear ratios (=rotational speed of input shaft 30/rotational speed of output shaft 50) as shown in FIG. 8 are realized. In FIG. 8, $1^{st}$, $2^{nd}$, $3^{rd}$ and $4^{th}$ respectively represent forward gears of first gear, second gear, third gear and fourth gear, with gear ratios becoming sequentially smaller from first gear to fourth gear. Also in FIG. 8, Rev, D, S and L represent ranges alternately selected by operation of the shift lever 84. In FIG. 8, a ○ mark represents an engaged state while a X mark represents a disengaged state. For example, a gear shift operation shift up from third gear to fourth gear in the D range is carried out by simultaneously executing an operation to disengage clutch C1 which is in an engaged state, and an operation to engage the brake B1 which is in a disengaged state.

The hydraulic controller 18 comprises two electromagnetic switch valves SV1 and SV2 used in control of the gear stages of the automatic transmission, a linear solenoid valve SLT for generating a line hydraulic pressure P1 according to throttle opening amount TA detected by a throttle opening amount sensor 76, which will be described later, a linear solenoid valve SLU for generating hydraulic pressure for controlling the engagement state of the lock-up clutch 40, and an oil temperature sensor 88 for detecting oil temperature $T_{OIL}$ of hydraulic fluid within the hydraulic controller 18.

Signals from the throttle opening amount sensor 76 for detecting throttle opening amount TA, an engine speed sensor 78 for detecting speed Ne of the engine 10, an input shaft rotation speed sensor 80 for detecting rotation speed Nt of the input shaft 30, an output shaft rotation speed sensor 82 for detecting rotation speed Nc of the output shaft 50, an operating position sensor 86 for detecting operating position of the shift lever 84, namely one of the ranges P, R, N, D2 or L, and the oil temperature sensor 88 etc. for detecting oil temperature $T_{OIL}$ of the hydraulic fluid in the hydraulic controller 18, are input to the electronic controller 20. The electronic controller 20 processes these input signals and based on results of that processing carries out control of, for example, the electromagnetic switch valves SV1, SV2 and the linear solenoid valves SLT and SLU. The electronic controller 20 also comprises inertia phase control means 116 having a structure that will be described later for performing control of engaged clutch or brake transmission torque control and engine torque control in the inertia phase.

Next a description of the structure of the hydraulic controller 18 will be given using FIG. 9. A primary pressure generator 90 is provided with a linear solenoid valve SLT, and line hydraulic pressure P1, that is the pressure of hydraulic fluid supplied from a hydraulic pressure pump 92 driven to rotate by the engine 10 pressure regulated to a value depending on engine load, is output to shift valve gear 94 etc. as primary pressure for the frictional engagement devices C1, C2, C3, B1, B2 and B3. A manual valve 96 is mechanically connected to the shift lever 84, and by switching the line pressure P1 according to a running range of the shift lever 84 a hydraulic pressure corresponding to the selected running range is output to the shift valve gear 94. Also, the electromagnetic switch valves SV1 and SV2 are operated by commands from the electronic controller in order to select a gear stage, and signal pressure is output to the shift valve gear 94.

The shift valve gear 94 comprises a 1–2 shift valve, a 2–3 shift valve and a 3–4 shift valve, not shown in the drawings, that are switched at the time of gear shift based on hydraulic pressure signals from the electromagnetic switch valves SV1 and SV2 according to running range from the manual valve 96, and engagement hydraulic pressure is selectively supplied to the respective frictional engagement devices C1, C2, C3, B1, B2 and B3 so as to realize the gear stages shown in FIG. 8. Accumulators AC1, AC2, AC3, AB1, AB2 and AB3 for moderating rise in supplied hydraulic pressure, namely coupling force, are respectively connected to oilways to the frictional engagement devices C1, C2, C3, B1, B2 and B3. Line hydraulic pressure P1 controlled by commands from the electronic controller 20 is respectively supplied to the accumulators AC1, AC2, AC3, AB1, AB2 and AB3 as accumulator back pressure, and control of supplied hydraulic pressure for each of the frictional engagement devices in the inertia phase described later is carried out by adjustment of this line hydraulic pressure P1.

Figure 10:
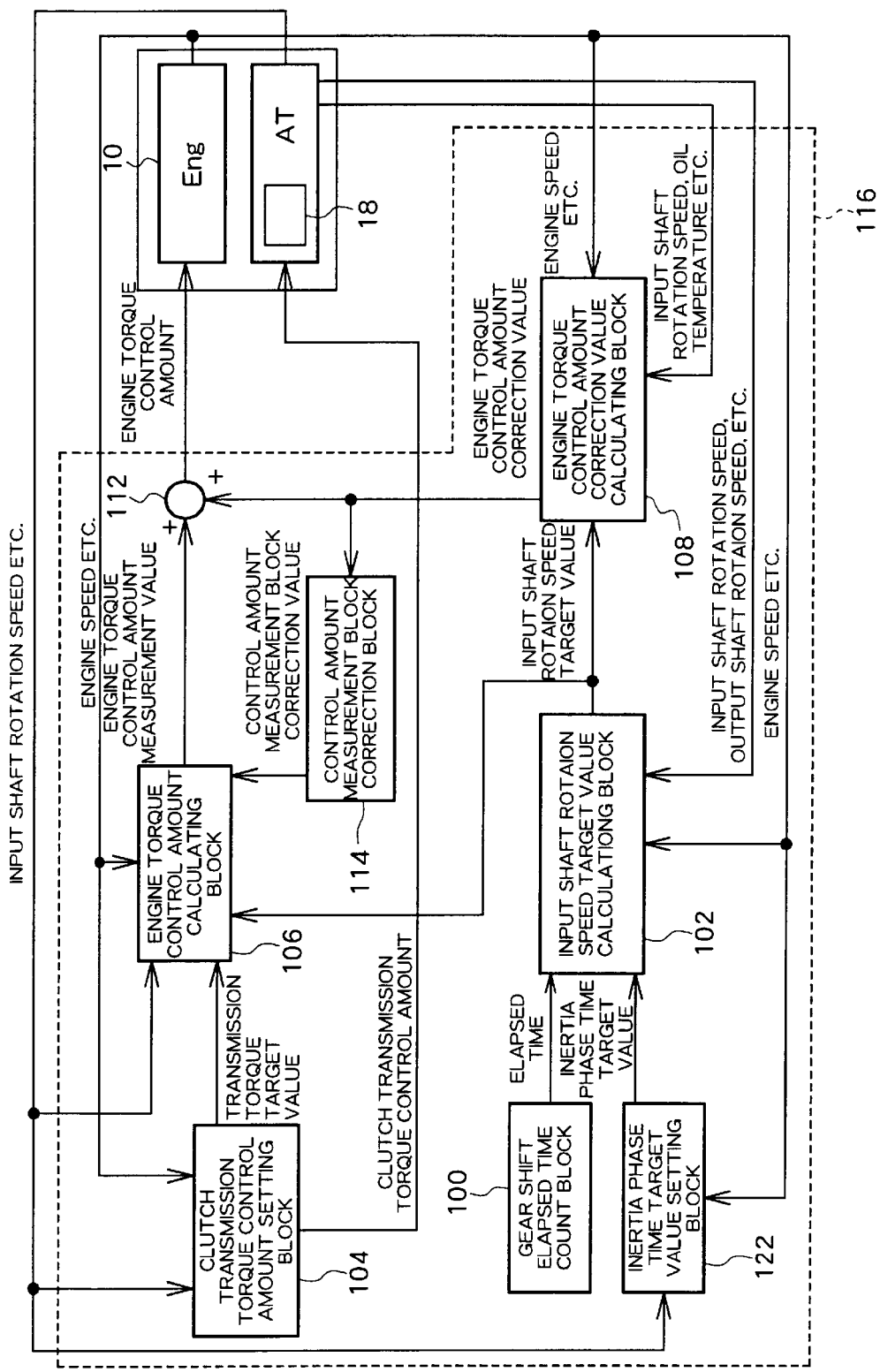
FIG. 10 is a block diagram showing a structural example of inertia phase control means inside an electronic controller of an embodiment.

Next, the structure of the inertia phase control means 116 for carrying out engaged clutch or brake transmission torque control and engine torque control in the inertia phase will be described using the block diagram of FIG. 10. In the following description, the case of a shift up from third gear to fourth gear by engaging the brake B1 while disengaging the clutch C1 will be described as an example of gear shift control. However, applicable gear shift operations of the inertia phase control means 116 of this embodiment are not limited to this and the inertia phase control means 116 of this embodiment can be applied to any case as long as a gear shift operation causes engagement of a clutch or brake while controlling transmission torque.

A gear shift elapsed time count block 100 has a counter, and calculates elapsed time ti after transition into the inertia phase and outputs this elapsed time ti. Here, with respect to the inertia phase start time, for example, it is set to the time where a difference between (gear ratio before gear shift operation X rotation speed Nc of the output shaft 50) and rotation speed Nt of the input shaft 30 becomes greater than or equal to a specified value. Once the gear shift operation is completed the counter is reset.

An inertia phase time target value setting block 122, as inertia phase time setting means, sets and outputs an inertia phase time target value tir, which is required time, after starting to draw in the rotational speed of the input shaft 30, to draw the rotational speed of the input shaft in until settling at rotation speed of the output shaft 50 and a target gear ratio. Here, the inertia phase time target value is set taking into consideration durability of the clutch or brake, and is set according to, for example, input shaft 30 torque Tt at the time of starting the gear shift operation. Alternatively, it is possible to detect torque Tt of the input shaft 30 in the inertia phase at a specified time and to correct setting of the inertia phase time target value tir at the specified time. With respect to input shaft 30 torque Tt, if a torque sensor is not used it is possible to calculate an estimation value Tt1 using equation (1), for example.

$$Tt1 = t(e) \times C(e) \times Ne^2 \qquad \text{Equation (1)}$$

Here, t(e) is torque ratio of the torque converter 12 while C(e) is a capacity coefficient of the torque converter 12, with both having fixed values according to velocity ratio e (=Nt/Ne). Accordingly, by inputting signals representing speed Ne of the engine 10 and rotation speed Nt of the input shaft 30 of the automatic transmission 14, it is possible to calculate an input shaft 30 torque estimation value Tt1.

Signals representing inertia phase elapsed time ti, inertia phase time target value tir, rotation speed Ne of engine 10, rotation speed Nt of input shaft 30 of the automatic transmission 14 and rotation speed Nc of output shaft 50 are input to the input shaft rotation speed target value calculating block 102, where a target value Nr for rotation speed of the input shaft 30 is calculated and output. Here, time variation of rotation speed target value Nr of the input shaft 30 is represented by equation (2), and the rotation speed target value Nr of the input shaft 30 can be obtained by updating only by a target value time varying portion represented in equation (2).

$$dNr/dt = ((1/(1+\rho r)-1) \times (dNc/dt \times ti + Nc) + dNc/dt \times tir)/tir \qquad \text{eq.2}$$

Here, ρ r is a coefficient fixed according to gear ratio before and after gear shift. Also, in equation 2, if rotation speed Nc of the output shaft 50 in the inertia phase is constant, dNc/dt is approximately 0.

In the clutch transmission torque control amount setting block 104, as transmission torque command value setting means, a brake B1 transmission torque target value Tbr is set, and a transmission torque target value Tbr for the brake B1, as well as a clutch transmission torque control amount, as a transmission torque command value for controlling transmission torque of the brake B1 in accordance with this target value Tbr, are output. Here, the transmission torque target value Tbr for the brake B1 is set taking into consideration gear shift shock, and is set, for example, by previously storing a control map for setting an appropriate transmission torque target value based on torque Tt of the input shaft 30 and then using the torque Tt of the input shaft 30 and this control map. Alternatively, it is possible to set time series variations of transmission torque target value Tbr according to torque Tt of the input shaft 30 at the time of starting a gear shift operation. With respect to the torque Tt of the input shaft 30, if a torque sensor is not used it is possible to input signals representing, for example, rotation speed Ne of the engine 10 and rotation speed Nt of the input shaft 30 of the automatic transmission 14 and to calculate a estimation value Tt1 using equation (1).

Also, in order to control transmission torque of the brake B1, hydraulic pressure supplied to the brake B1 is controlled. Here, the relationship of equation 3 exists between transmission torque T of the frictional engagement device and hydraulic pressure P supplied to the frictional engagement device.

$$T = (S \times P - F) \times \mu \times r \times z \qquad \text{equation (3)}$$

S is piston area receiving pressure, F is return spring set load, $\mu$ is frictional coefficient, r is facing effective radius, and z is number of facing acting surfaces. With respect to frictional coefficient $\mu$, it is preferable to use a characteristic that takes into consideration slip velocity (calculated from rotational speed Nt of the input shaft 30, rotational speed Nc of the output shaft 50, and the number of teeth of each gear constituting the first planetary gear 52 and the second planetary gear 54).

Figure 9:
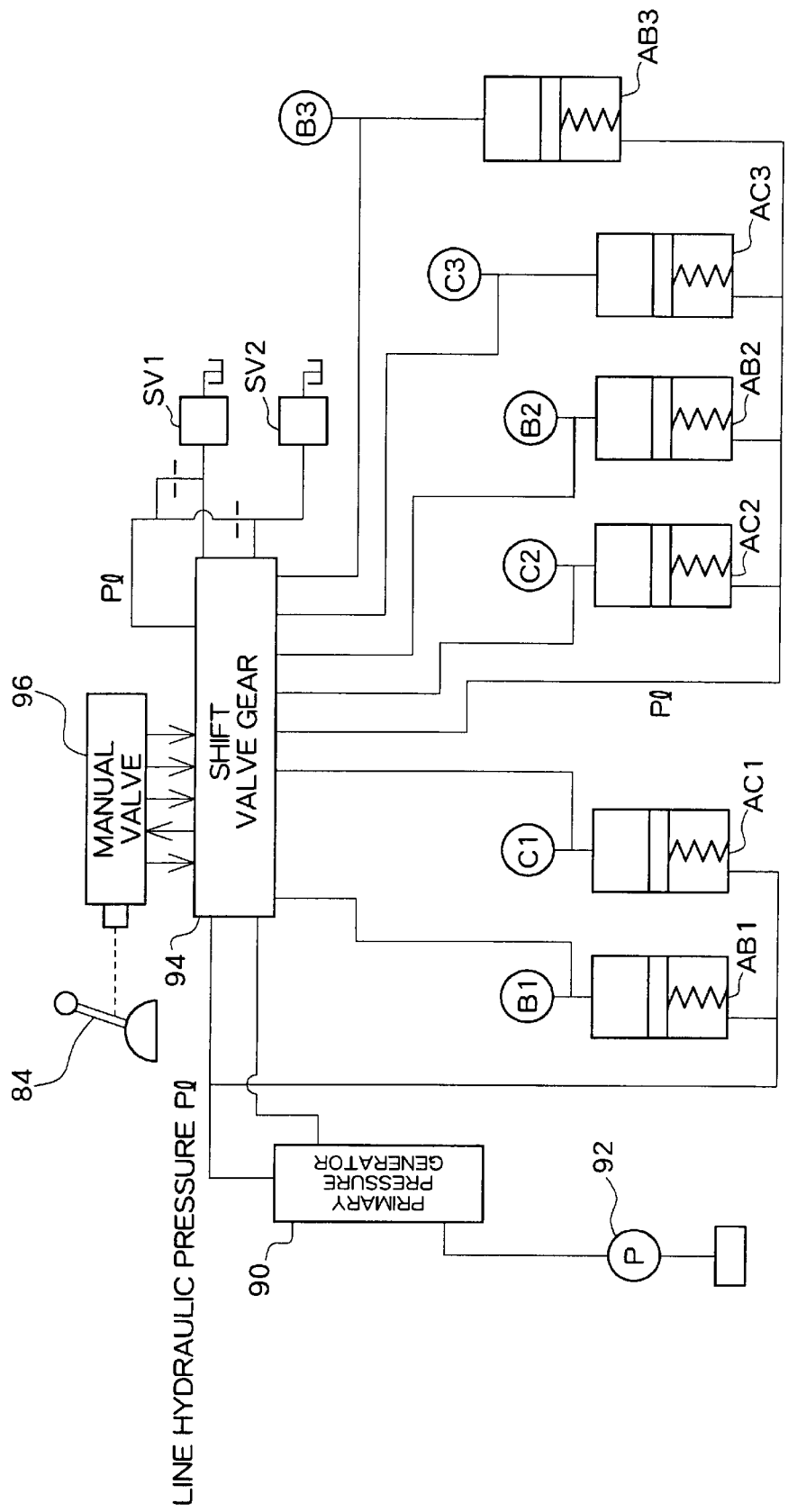
FIG. 9 is a drawing showing the outline structure of a hydraulic controller of an embodiment.

With the hydraulic controller 18 shown in FIG. 9, in order to control hydraulic pressure supplied to the brake B1, line pressure P1 supplied to the accumulator AB1 as back pressure is controlled. Accordingly, a clutch transmission torque control amount output from the clutch transmission torque control amount setting block 104 becomes a command value for controlling line hydraulic pressure P1.

Signals representing transmission torque target value Tbr of the brake B1, rotation speed Ne of the engine 10, rotation speed Nt of the input shaft 30 of the automatic transmission 14 and rotation speed target value Nr of the input shaft 30 etc. are input to the engine torque control amount calculating block 106. An engine torque target value is then calculated as a drive torque target value and an engine torque control amount measured value is output as a drive torque command value for controlling engine torque in accordance with target value Ter. Here, drive torque command value calculation means is made up of the input shaft rotation speed target value calculating block 102 and the engine torque control amount calculating block 106. In order to control engine torque, control such as, for example, ignition timing adjustment, valve timing adjustment using a variable valve timing mechanism, throttle opening amount adjustment using an electronically controlled throttle or fuel injection amount is carried out. As a result, an engine torque control amount measured value becomes a command value for carrying out these control functions. Here, engine torque target value Ter is represented by the physical equation shown in equation (4).

$$Ter = (dNr/dt - a1 \times Tbr - a2 \times Tw/(a3 \times t(e)) + Ie \times dNe/dt \qquad (4)$$

Ie is inertia of the engine 10, a1, a2 and a3 are inertia of each rotating shaft constituting the automatic transmission 14, and are constants fixed from the number of teeth of each gear constituting the first planetary gear 52 and the second planetary gear 54. Tw is running resistance (experimentally calculated), and while equation (4) is an equation taking into consideration running resistance Tw, it is also possible to not consider running resistance Tw. dNr/dt is variation over time of the rotation speed target value Nr of the input shaft 30. Here, transmission torque of the brake B1 is estimated using transmission torque target value Tbr.

A signal representing rotation speed Ne of the engine 10, rotation speed Nt of the input shaft 30, rotation speed target value Nr of the input shaft 30 of the automatic transmission 14, and oil temperature $T_{OIL}$ of the hydraulic fluid inside the hydraulic controller 18 are input to the engine torque control amount correction value calculating block 108 which acts as feedback compensation means. Here, deviation between rotation speed target value Nr of the input shaft 30 and rotation speed Nt of the input shaft 30 of the automatic transmission 14 is calculated and an engine torque control amount correction value for compensating the engine torque control amount measured value is calculated and output based on this deviation. The engine torque control amount correction value can be obtained by multiplying the deviation between Nr and Nt by a proportional gain or it is possible to add a term that is an accumulated value of deviation between Nr and Nt multiplied by an integrated gain and a term that is a differential value of the deviation between N and Nt multiplied by a differentiated gain. Here, proportional gain, integrated gain and differentiated gain are set experimentally.

An engine torque control amount correction value is input to the control amount measurement block correction block 114. A control amount measurement block correction value is then calculated based on the engine torque control amount correction value and output to the engine torque control amount calculating block 106. In the engine torque control amount calculating block 106, a characteristic of speed ratio e—torque ratio (e), and also values of coefficients Ie, a1, a2 and a3 are corrected through learning using the control amount measurement block correction value so that the engine torque control amount correction value becomes minimum.

A clutch transmission torque control amount is input to the hydraulic controller 18. Transmission torque of the brake B1, namely line hydraulic pressure Pl, is controlled by the hydraulic controller 18 based on this clutch transmission torque control amount. Also, engine torque control amount measurement value and engine torque control amount correction value are added by an adder 112 and then input to the engine 10. Engine torque is controlled in the engine based on this added engine torque control amount.

Figure 11:
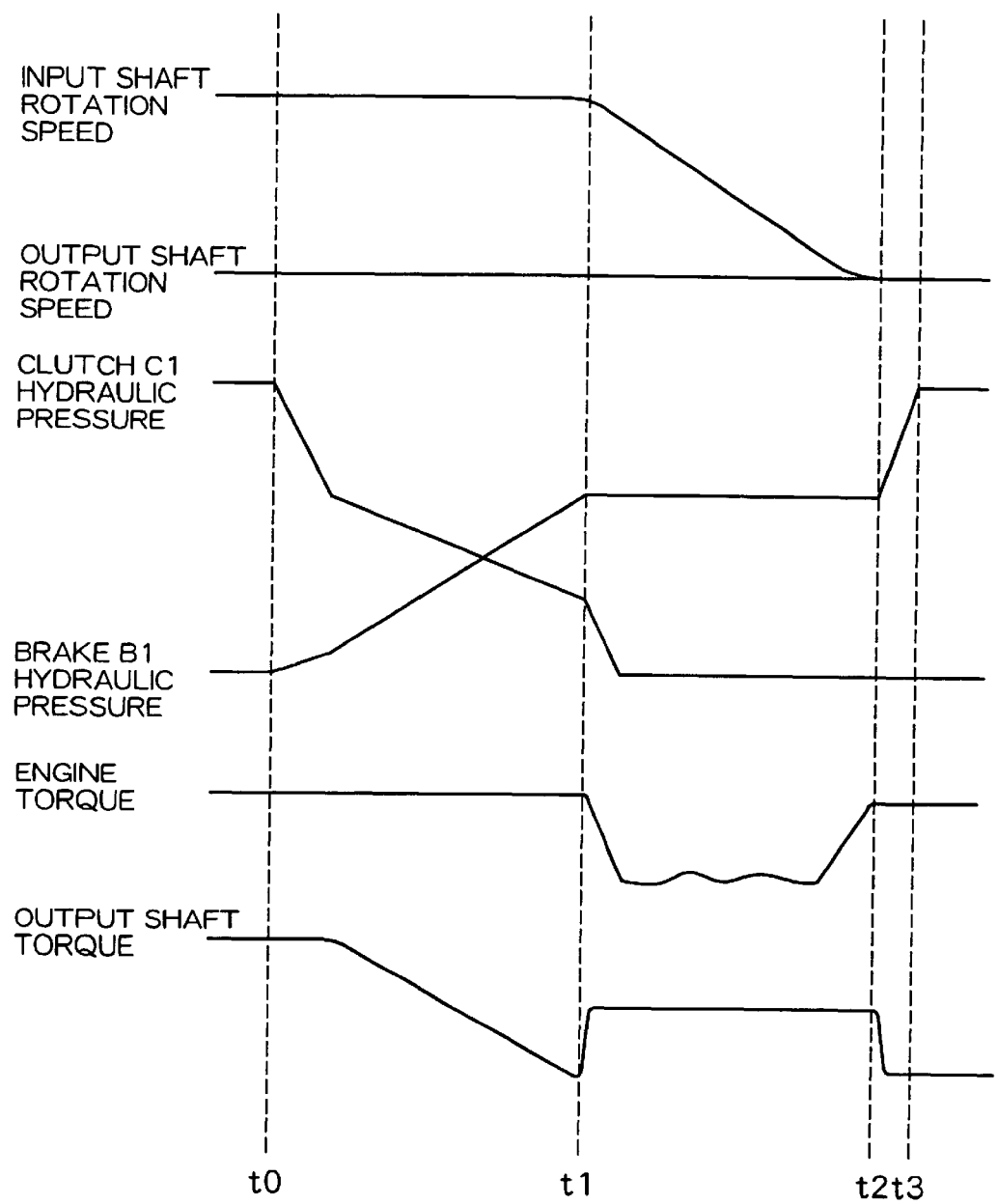
FIG. 11 is a timing chart showing variation over time of input shaft rotation speed, output shaft rotation speed, hydraulic pressure supplied to clutch C1, hydraulic pressure supplied to brake B1, engine torque and output shaft torque in an automatic transmission controller of the embodiment at the time of a gear shift operation.

One example of the operation of this embodiment will now be described using FIG. 11. Here again description will be given for the case of a shift up from third gear to fourth gear by engaging the brake B1 while disengaging the clutch C1. FIG. 11 is a timing chart showing variation over time of rotation speed Nt of the input shaft 30, rotation speed Nc of the output shaft 50, hydraulic pressure supplied to the brake B1, hydraulic pressure supplied to the clutch C1, engine torque Te, and torque Tc of the output shaft 50. However, it is assumed here that rotation speed Nc of the output shaft 50 is constant. Also in FIG. 11, for convenience of the description rotation speed Nc of the output shaft 50 uses a value that is corrected by the gear ratio of the fourth gear, and after completion of the gear shift to fourth gear the rotation speed Nt of the input shaft 30 is illustrated as coinciding with rotation speed Nc of the output shaft 50.

If a gear shift command is output (time t0 in FIG. 11), oilways from the shift valve gear 94 to each of the frictional engagement devices are switched to reduce the hydraulic pressure supplied to the clutch C1 and increase the hydraulic pressure supplied to the brake B1. If the hydraulic pressure supplied to the clutch C1 is reduced and the hydraulic pressure supplied to the brake B1 is increased in this manner, then eventually the input shaft 30 is drawn in the direction of the fourth gear. At that point in time (time t1 in FIG. 11), hydraulic pressure supplied to the clutch C1 is controlled so to as to become minimum hydraulic pressure, and the inertia phase control of this embodiment commences. In this inertia phase control, control of hydraulic pressure supplied to the brake B1 is carried out and control of engine torque is carried out. Here, with respect to control of hydraulic pressure supplied to the brake B1, increase in hydraulic pressure supplied to the brake B1 is suppressed so that a gear shift shock level is no greater than a specified level. In order to suppress increase in the hydraulic pressure supplied to the brake B1, the line hydraulic pressure Pl is reduced. With respect to engine torque control, engine torque is reduced (to) less than a value at the time of commencing the gear shift operation so that rotation speed Nt of the input shaft 30 coincides with rotation speed target value Nr of the input shaft 30 calculated based on inertia phase time target value tir. In this way, rotation speed Nt of the input shaft 30 is drawing in a direction of a value that is rotation speed Nc of the output shaft 50 multiplied by the gear ratio of fourth gear. Then, once rotation speed Nt of the input shaft 30 coincides with the value that is rotation speed Nc of the output shaft 50 multiplied by the gear ratio of fourth gear (time t2 in FIG. 11), drawing in of the rotation speed Nt of the input shaft 30 is terminated and hydraulic pressure supplied to the brake B1 is increased to a specified value to complete the gear shift operation (time t3 in FIG. 11). Here, the time from time t1 to time t2 constitutes the inertia phase time.

In this embodiment, first of all the inertia phase time target value tir is set, then rotation speed target value Nr of the input shaft 30 is calculated based on the inertia phase time target value tir. Also, transmission torque target value Tbr of the engaged brake B1 is set and a clutch transmission torque control amount for controlling in accordance with this target value Tbr is output to the hydraulic controller 18. Here, with respect to gear shift shock performance, since brake B1 transmission torque is predominant, it is possible to satisfy gear shock performance by setting and controlling transmission torque target value Tbr of the engaged brake B1 so that gear shock level is no greater than a specified level. Engine torque target value Ter is then calculated using the physical equation (4) using rotation speed target value Nr of the input shaft 30 and transmission torque target value Tbr, and an engine torque control amount measurement value for controlling according to this target value Ter is output to the engine 10. Accordingly, there is no need to use a control map for obtaining the engine torque control amount measurement value and it is possible to do away with an operation of experimentally ascertaining the engine torque control amount measurement value. In equation (4), by setting inertia phase time target value tir to less than or equal to a specified time it is possible to calculate engine torque target value Ter capable of satisfying gear shift time performance. Since engine torque control has hardly any effect on the gear shift shock performance, it is possible to satisfy apparently mutually conflicting gear shift shock and gear shift time performance by controlling engine torque so as to become the target value Ter. Accordingly, in the inertia phase control it is possible to significantly reduce the time needed to create a control map while satisfying both gear shift shock and gear shift time performance issues.

Also, since an input shaft rotation speed sensor 80 is provided as in the related art, it is possible to easily carry out feedback control by supplying rotation speed target value Nr of the input shaft 30 as a control target value. Control of rotation speed Nt of the input shaft 30 using engine torque can then improve compliance of rotation speed Nt of the input shaft 30 with the target value Nr, even in the event that noise such as variation in the frictional coefficient of the brake B1 arises, by carrying out feedback compensation of the engine torque control amount measurement value using the engine torque control amount correction value since responsiveness due to control of rotation speed Nt of the input shaft 30 using hydraulic pressure supplied to the brake B1 is excellent.

Figure 12:
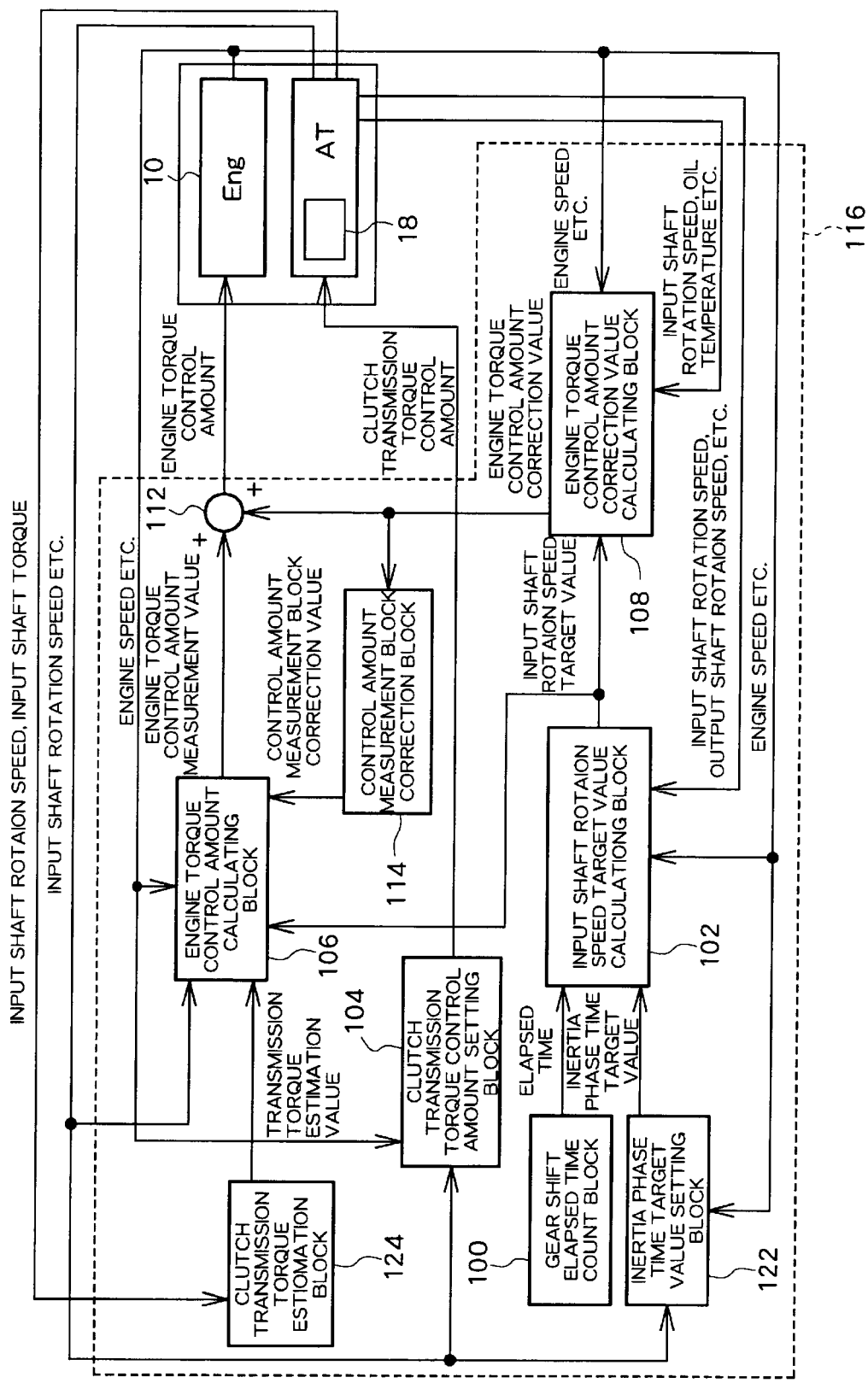
FIG. 12 is a block diagram showing a structural example of inertia phase control means inside an electronic controller of another embodiment.

FIG. 12 is a block diagram of an automatic transmission control unit of a still further embodiment of the present invention. In this embodiment, a clutch transmission torque estimation block 124 is provided as transmission torque estimation means. Signals representing rotation speed Nt of the input shaft 30 of the automatic transmission 14 and torque Tt of the input shaft 30 are input to the clutch transmission torque estimation block 124, where brake B1 transmission torque Tb1 is calculated and output. With respect to torque Tt of the input shaft 30, it is either detected using a torque sensor or estimated using an input shaft torque estimation block that will be described later. Instead of brake B1 transmission torque estimation value Tbr, brake B1 transmission torque estimation value Tb1 is input to the engine torque control amount calculating block 106, and when calculating engine torque target value Ter using equation (4) brake B1 transmission torque estimation value Tb1 is used instead of brake B1 transmission torque estimation value Tbr. Overall structure of the remaining hydraulic controller 18 etc. is the same as for the first embodiment, and therefore description will be omitted. Here brake B1 transmission torque estimation value Tb1 is represented by the physical equation shown in equation (5).

$$Tb1 = A \times dNt/dt + B \times Tt + C \times Tw \qquad (5)$$

A, B and C are constants determined from inertia of each rotating shaft constituting the automatic transmission 14, and the number of teeth of each gear constituting the first planetary gear 52 and the second planetary gear 54. Also, equation 5 takes into consideration running resistance Tw but it is also possible to not take running resistance Tw into consideration, similarly to equation (4).

With this embodiment also, there is no need to use a control map for obtaining the engine torque control amount measurement value and it is possible to do away with an operation of experimentally ascertaining the engine torque control amount measurement value. Also with this embodiment, even in the event that it is not possible to control brake B1 transmission torque by means of the target value Tbr due to noise such as hydraulic response lag or variation in frictional coefficient of the brake B1, it is possible to improve compliance of rotation speed Nt of the input shaft 30 to the target value Nr by calculating brake B1 transmission torque estimation value Tb1 using the physical equation (5) and calculating the engine torque estimation value Ter using the physical equation (4), and it is possible to realize more accurate inertia phase control.

Figure 13:
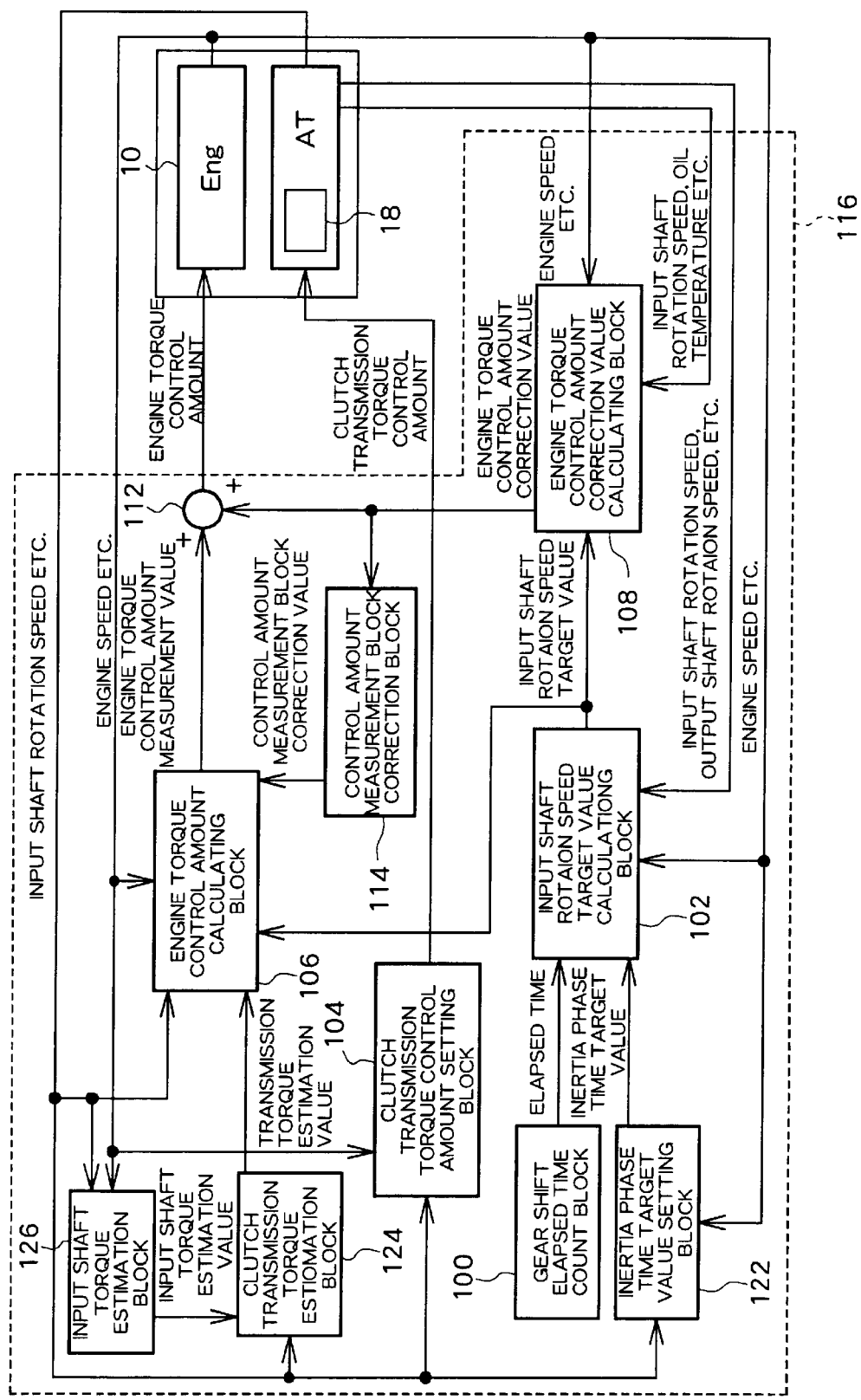
FIG. 13 is a block diagram showing an example structure of another inertia phase control means inside an electronic controller.

With this embodiment as shown in the block diagram of FIG. 13, it is possible to calculate input shaft 30 torque Tt without using a torque sensor by providing the input shaft torque estimation block 126. Signals representing rotation speed Ne of the engine 10 and rotation speed Nt of the input shaft 30 of the automatic transmission 14 etc. are input to the input shaft torque estimation block 126, and input shaft 30 torque estimation value Tt1 is calculated and output. Input shaft 30 torque estimation value Tt1 is then input to the clutch transmission torque estimation block 124 and used in calculation of brake B1 transmission torque estimation value Tb1 using equation (5). Here input shaft 30 torque estimation value Tt1 can be calculated using equation (1).

In this way, in the structure of the block diagram of FIG. 13, by calculating input shaft 30 torque estimation value Tt1 there is no need for a torque sensor and it is possible to reduce costs.

Figure 14:
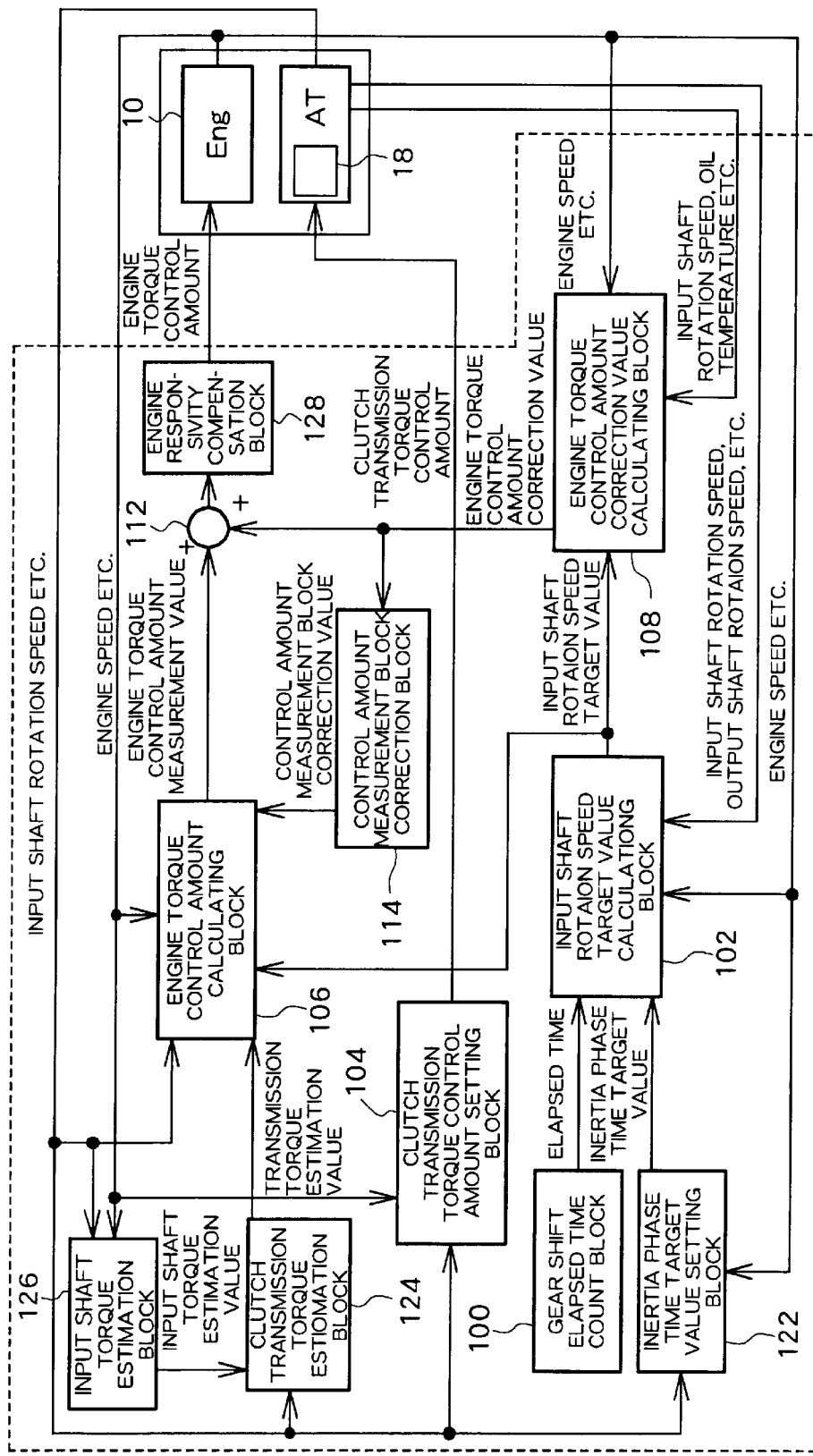
FIG. 14 is a block diagram showing an example structure of inertia phase control means inside an electronic controller of a further embodiment.

FIG. 14 is a block diagram of an automatic transmission controller of a further embodiment of the present invention. In this embodiment, an engine responsiveness compensation block 128 is provided at the output of the adder 112 as dynamic characteristic compensation means. The engine responsiveness compensation block 128 stores an inverse characteristic model for the dynamic characteristic between engine control amount and engine torque, the engine torque control amount is further compensated based on this inverse characteristic model and output to the engine 10. For example, with respect to the dynamic characteristic between engine control amount and engine torque, a primary lag model for time constant td is considered. Here, the value of td is set by experimentation. The overall structure of the remaining hydraulic controller 18 etc is the same as for the second embodiment, and description will be omitted.

In this embodiment also, there is no need to use a control map for obtaining the engine torque control amount measurement value and it is possible to do away with an operation of experimentally ascertaining the engine torque control amount measurement value. Also with this embodiment, since engine torque control amount is compensated based on an inverse characteristic model of a dynamic characteristic between engine torque control amount and engine torque, it is possible to compensate engine torque response lag with respect to input of the engine torque control amount. It is therefore possible to further improve compliance of rotation speed Nt of the input shaft 30 with rotation speed target value Nr of the input shaft 30, and to realize more accurate inertia phase control.

In each of the embodiments, description has been given for cases where input shaft rotation speed target value Nr is calculated from inertia phase time target value tir, and engine torque is controlled so that rotation speed Nt of the input shaft coincides with this target value Nr, but it is also possible to calculate a target value for input shaft rotation speed variation over time dNr/dt from the inertia phase time target value tir and to carry out control of the engine torque so that input shaft rotation speed variation over time dNt/dt coincides with this target value dNr/dt. In each of the embodiments, a description has been given for cases where the drive source is an engine, but the present invention is also applicable when the drive source is an electric motor. However, in the case of an electric motor as a drive source, instead of the subject of control being engine torque the subject is electric motor current. Also, the structure of an automatic transmission is not limited to the structure shown in FIG. 7, and the present invention can be applied as long as an automatic transmission performs gear shift operations to engage clutches or brakes while controlling transmission torque. Further, the structure of the hydraulic circuit is not limited to the structure shown in FIG. 9, and the present invention can be applied as long as the hydraulic circuit can control hydraulic pressure supplied to clutches or brakes.

What is claimed is:

1. An automatic transmission controller, for carrying out clutch to clutch control to change a gear ratio by disengaging a disengagement side clutch while engaging an engagement side clutch, comprising:

a setting block for setting engagement side clutch coupling force to a specified pattern; and a disengagement side clutch coupling force determination block for determining disengagement side clutch coupling force in a torque phase of clutch to clutch control using a physical model of the automatic transmission, based on the engagement side clutch coupling force.

2. The automatic transmission controller of claim 1, further comprising an engagement side estimation block for estimating engagement side clutch transmission torque, wherein disengagement side clutch coupling force is determined with a physical model using estimated engagement side clutch transmission torque.

3. The automatic transmission controller of claim 1, further comprising a disengagement side estimation block for estimating disengagement side clutch transmission torque, wherein disengagement side clutch coupling force is determined with a physical model using estimated disengagement side clutch transmission torque.

4. The automatic transmission controller of claim 1, further comprising:
  an engagement side estimation block for estimating engagement side clutch transmission torque; and
  a disengagement side estimation block for estimating disengagement side clutch transmission torque
  wherein disengagement side clutch coupling force is determined with a physical model using estimated disengagement side and engagement side clutch transmission torque.

5. An automatic transmission controller, having an input shaft supplied with drive torque of a drive motor, an output shaft for transmitting drive torque to a load, and a plurality of frictional engagement devices provided between the input shaft and the output shaft, for controlling an automatic transmission to switch gear ratios by switching those frictional engagement devices, among the plurality of frictional engagement devices, that are being engaged, provided with
  an inertia phase control block for controlling transmission torque of engaged frictional devices and drive torque of the drive motor in an inertia phase, being a zone where input shaft rotation speed is drawn in a direction of a rotation speed determined by output shaft rotation speed and a target gear ratio, the inertia phase control block comprising:
    an inertia phase time setting block for setting an inertia phase time target value;
    a transmission torque command value setting block for outputting a transmission torque command value for controlling transmission torque of frictional engagement devices being engaged according to set transmission torque target value;
    a transmission torque estimation block for estimating transmission torque of frictional engagement devices being engaged; and
    a drive torque command value calculating block for calculating a drive torque target value from a physical equation that uses the inertia phase time target value and the transmission torque estimation block estimation value and outputting a drive torque command value for controlling drive torque of the drive motor according to the drive torque target value.

6. The automatic transmission controller of claim 5, wherein the drive torque command value calculating block calculates an input shaft rotation speed target value based on the inertia phase time target value, and calculates the drive torque target value from a physical equation that uses the input shaft rotation speed target value and the transmission torque estimation block estimation value.

7. The automatic transmission controller of claim 5, wherein the drive torque command value calculating block calculates a target value for variation of input shaft rotation speed over time based on the inertia phase time target value, and calculates the drive torque target value from a physical equation that uses the target value for variation of input shaft rotation speed over time and the transmission torque estimation block estimation value.

8. The automatic transmission controller of claim 5, wherein the transmission torque estimation block estimates transmission torque of frictional engagement device being engaged from the transmission torque target value.

9. The automatic transmission controller of claim 5, having an input shaft torque detector for detecting input shaft torque and an input shaft rotation speed sensor for detecting input shaft rotation speed, wherein the transmission torque estimation block estimates transmission torque of frictional engagement devices being engaged from a physical equation that uses input shaft torque and input shaft rotation speed.

10. The automatic transmission controller of claim 6, having an input shaft rotation speed sensor for detecting input shaft rotation speed, wherein the inertia phase control block further comprises a feedback compensation block for compensating the drive torque command value based on deviation between input shaft rotation speed target value and input shaft rotation speed.

11. The automatic transmission controller of claim 7, having an input shaft rotation speed sensor for detecting input shaft rotation speed, wherein the inertia phase control block further comprises a feedback compensation block for compensating the drive torque command value based on deviation between target value for variation in input shaft rotation speed over time and variation in input shaft rotation speed over time.

12. The automatic transmission controller of claim 5, wherein the inertia phase control block further comprises a dynamic characteristic compensation block for compensating the drive torque command value based on a dynamic characteristic model between the drive torque command value and drive torque of the drive motor.

13. The automatic transmission controller of claim 5, having a hydraulic controller, for controlling transmission torque of the frictional engagement device using hydraulic pressure, wherein the transmission torque command value setting block controls transmission torque of frictional engagement device being engaged by controlling hydraulic pressure supplied from the hydraulic controller using the transmission torque command value.

14. The automatic transmission controller of claim 5, wherein the drive motor is an engine, and wherein the drive torque command value calculating block controls engine drive torque by controlling engine ignition timing using the drive torque command value.

* * * * *